United States Patent

Kojima et al.

[11] Patent Number: 5,882,692
[45] Date of Patent: Mar. 16, 1999

[54] RESIN MOLDING APPARATUS

[75] Inventors: Akira Kojima, Oita; Tsuneyuki Hayashi, Kanagawa; Hiroyuki Fukasawa, Tokyo; Takashi Saito, Oita, all of Japan

[73] Assignee: Sony Corporation, Tokyo, Japan

[21] Appl. No.: 829,207

[22] Filed: Mar. 31, 1997

Related U.S. Application Data

[62] Division of Ser. No. 499,778, Jul. 7, 1995, Pat. No. 5,650,177.

[30] Foreign Application Priority Data

Jul. 6, 1994 [JP] Japan .................................. 6-179495

[51] Int. Cl.$^6$ .................................................. B29C 45/02
[52] U.S. Cl. ..................... 425/116; 425/121; 425/183; 425/190; 425/544; 425/588; 425/DIG. 228; 249/114.1; 249/115; 249/135
[58] Field of Search .................................. 249/134, 135, 249/115; 425/190, 408, 544, 116, 183, 588, DIG. 228, 121

[56] References Cited

U.S. PATENT DOCUMENTS

| | | |
|---|---|---|
| 3,380,121 | 4/1968 | Chittenden et al. .................... 425/408 |
| 4,779,835 | 10/1988 | Fukushima et al. . |
| 4,872,825 | 10/1989 | Ross . |
| 5,061,164 | 10/1991 | Sabado et al. . |
| 5,139,407 | 8/1992 | Kim et al. .............................. 425/193 |
| 5,252,051 | 10/1993 | Miyamoto et al. . |
| 5,336,272 | 8/1994 | Tsutsumi et al. . |
| 5,468,141 | 11/1995 | Iwami et al. . |

FOREIGN PATENT DOCUMENTS

| | | | |
|---|---|---|---|
| 56-33915 | 4/1981 | Japan ..................................... 249/135 |
| 62-152131 | 1/1987 | Japan ..................................... 249/135 |
| 63-5538 | 1/1988 | Japan ..................................... 249/135 |
| 3-79045 | 4/1991 | Japan ..................................... 425/544 |

Primary Examiner—Jay H. Woo
Assistant Examiner—Robert Hopkins
Attorney, Agent, or Firm—Hill & Simpson

[57] ABSTRACT

A gate portion constituting a gate of a resin molding die is made of a hard alloy having a hardness greater than the predetermined hardness in the iron-based hard alloy used to from a cavity block and a center block. Opposing surfaces of the cavity block halves include a silicone rubber layer at least at the portions thereof which contact portions of the lead frame in a semiconductor encapsulation molding apparatus.

8 Claims, 2 Drawing Sheets

RESIN MOLDING APPARATUS

This is a division of application Ser. No. 08/499,778, filed Jul. 7, 1995 now U.S. Pat. No. 5,650,177.

BACKGROUND OF THE INVENTION

1. Field of the Invention

The present invention relates a resin molding die for obtaining a molding product comprising an electronic part such as a semiconductor device, capacitor or inductor by injecting a resin into a cavity.

2. Description of Related Art

A package for a semiconductor device such as LSI is formed by mounting a device formed as a chip on a lead frame or the line and then integrally encapsulating the device by a molding resin or the like.

In a case of integrally encapsulating a device by a molding resin or the like, a transfer molding apparatus has been used generally and a molding product is manufactured to a predetermined shape by setting a predetermined resin molding die to the transfer molding apparatus.

In a case of manufacturing a semiconductor device in the prior art, a package is constituted by mounting a chip-shaped device to a lead frame made of a 42 alloy (Fe—Ni alloy of 42% Ni), applying wirings by bonding wires, which is set to a resin molding die of a transfer molding apparatus and transferring and injecting a mold resin such as epoxy resin into a cavity of a die.

In the resin molding die used herein, an insert block having a cavity in which a resin is injected by way of a gate and a base block for incorporating and holding the insert block are disposed, respectively, to upper and lower dies, each of which is made of an iron-based hard metal hardened to a predetermined number of hardness.

Upon transfer molding, the upper die and the lower die are attached respectively in a separated state to a platen of the transfer molding apparatus, and a lead frame mounted with a device is set, for example, on the lower die heated to a predetermined temperature (150° C.–200° C.).

In this case, the device on the lead frame is disposed at a position for the cavity of the die.

Subsequently, a tablet-shaped resin is injected into a pot disposed to the lower die, and the upper die and the lower die are clamped.

The load on the die clamping is for example, about 196 kN per one lead frame such that a gap is not opened by the injected resin (about 7.8 MPa).

Further, slight elastic deformation is caused by the clamping load to each of contact portions between the upper and the lower dies and tie bars of the lead frame, to eliminate the gap for the contact portions thereby preventing leakage of the resin.

Then, the tablet-shaped resin is melted in the state of clamping the upper and the lower dies under such a load, and then the resin is injected by way of the gate into the cavity by pressing a plunger.

Thus, the periphery of the device on the lead frame disposed in the cavity can be covered with the resin, to complete a molding product conforming the shape of the cavity.

For the resin molding die, an iron-based hard alloy having a Vickers hardness Hv=about 58–63 and an Young's modulus of about $2 \times 10^{12}$ dyn/cm$^2$ is used with a view point of durability in use.

Further, vapor deposition of hard chromium or titanium nitride is applied to the surface of the insert block for improving the wearing resistance and mold releasability.

In recent years, it is considered a resin molding die having a structure capable of detaching the gate and using a super hard alloy for the gate, intended for the improvement of the durability in use.

However, the resin molding die described above involves the following problems.

That is, upon resin molding, if the clamping load between the upper and lower dies is lower than a predetermined value, injected resin leaks. For instance, in a case of a semiconductor device, the resin leaked to the lead portion of the lead frame forms burs to bring about disadvantage in subsequent steps.

That is, the clamping load has to be applied between the upper and lower dies to such an extent as capable of ensuring elastic deformation in an amount enough to inhibit the leakage of the resin at a portion of contact between the upper and lower dies and the tie bars of the lead frame.

Since the existent resin molding die is constituted with a hardened iron-based hard alloy, a press mechanism equipped with a large scaled hydraulic cylinder or the like is necessary in order to obtain an elastic deformation amount required for the portion of contact, which brings about a problem of increasing the size of the molding machine.

SUMMARY OF THE INVENTION

An object of the present invention is to provide a material for the die and a structure of a resin encapsulating apparatus.

That is, in the resin molding die according to the present invention an insert block having a cavity to which a resin is injected by way of a gate and a base block for incorporating and holding the insert block are disposed, respectively, to an upper die and a lower die, in which a gate portion constituting the gate is made of an iron-based hard alloy having a hardness greater than a predetermined value and at least the insert block excepting for the gate portion of the upper die and the lower die is of an alloy except for the iron-based hard alloy having a hardness lower than the predetermined hardness described above.

Further, in the resin molding die, at least the insert block excepting for the gate portion of the upper die and the lower die is made of an aluminum-based hard alloy or an analogous hard alloy.

Upon die clamping in resin molding, it is necessary to ensure such an amount of elastic deformation as to inhibit leakage of a resin in the pressurized portion of the upper die and the lower die.

In the present invention, since at least the insert block excepting for the gate portion of the upper die and the lower die is made of an alloy, other than the iron-based hard alloy, having a hardness lower than the predetermined hardness of the iron-based hard alloy, such an amount of elastic deformation as to inhibit leakage of the resin even if the clamping load between the upper die and the lower die is reduced in this portion as compared with the case of using the iron-based hard alloy having the predetermined hardness as described above can be obtained.

Further, even if the hardness of at least the insert block excepting for the gate portion of the upper die and the lower die is lower than the predetermined hardness, since the hard alloy having a hardness greater than the predetermined hardness is used for the gate portion, wearing resistance can be ensured for the portion most suffering from friction upon resin injection.

BRIEF DESCRIPTION OF THE DRAWINGS

FIG. 1A illustrates a die and FIG. 1B illustrates a molding machine.

DETAILED DESCRIPTION OF THE PREFERRED EMBODIMENTS

The present invention will be explained more in details by way of preferred embodiments of a resin molding die with reference to the drawings.

Figure 1A:
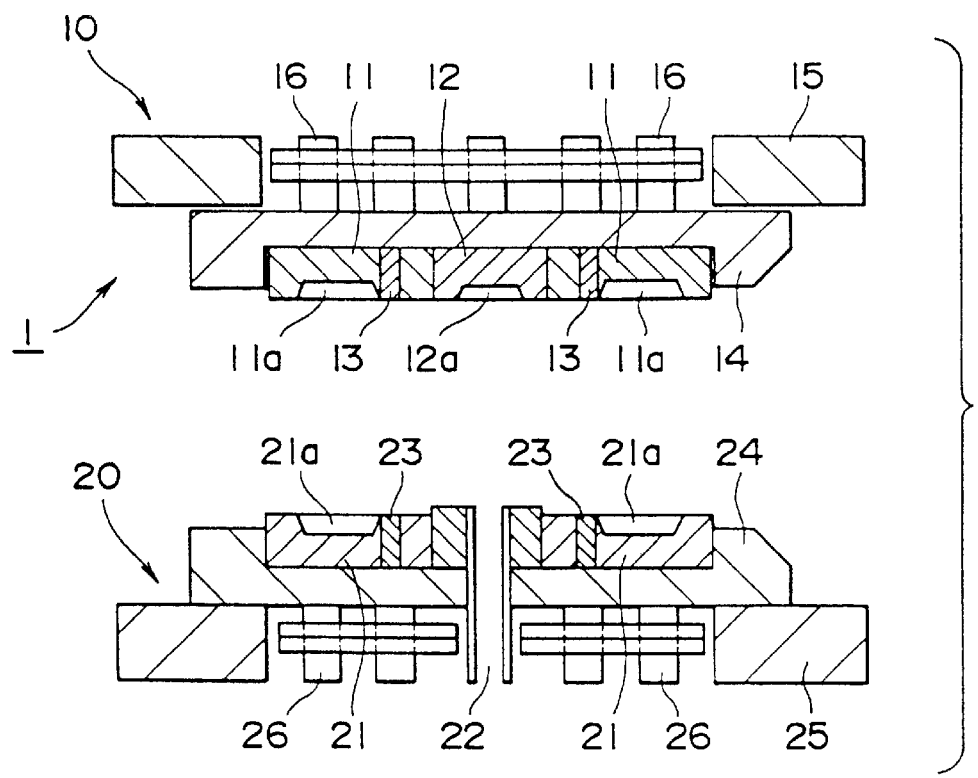
FIGS. 1A and 1B are schematic views explaining a resin molding die in a first embodiment according to the present invention.
Figure 1B:
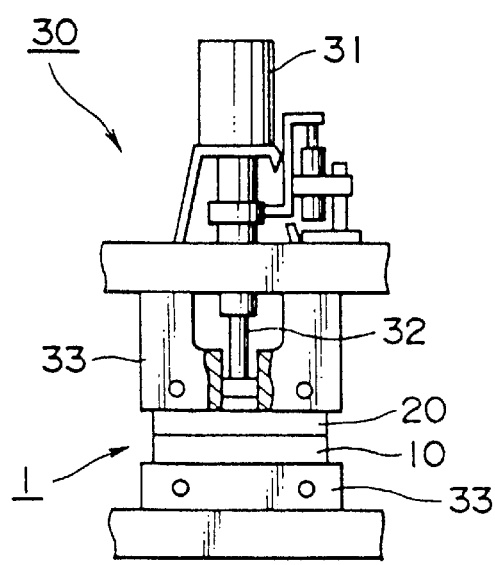

FIGS. 1A and 1B are schematic views for explaining a resin molding die as a first embodiment according to the present invention.

As shown in FIG. 1A, a resin molding die 1 in this embodiment comprises an upper die 10 and a lower die 20, which have cavity blocks 11, 12 each formed with a cavity 11a, 21a, gate portions 13, 23, holder basis 14, 24 for incorporating the cavity blocks 11, 21, side blocks 15, 25 for attaching the holder basis 14, 24 and support pillars 16, 26 for assistance upon die clamping, respectively.

Further, a center block 12 having a cull portion 12a is incorporated about at a central portion of the holder base 14 in the upper die 10, while a pot 22 is disposed about at a central portion of the lower die 20 so as to oppose the cull portion 12 of the upper die 10.

Each of the blocks incorporated in the holder basis 14, 24 is referred to as insert blocks and they are being replaceable in accordance with the shape of the molding product or the like.

The above-mentioned resin molding die 1 is used being attached to a molding machine 30, for example, as shown in FIG. 1B.

The molding machine 30 comprises a press mechanism 31 for clamping the resin molding die 1 under a predetermined load, a plunger 32 for injecting a resin to the cavities 11a, 21a of the resin molding die 1 (refer to FIG. 1A), and platens 33 for mounting the upper die 10 and the lower die 20 of the resin molding die 1 respectively.

Since the molding machine 30 shown in FIG. 1B is adapted as a type in which the plunger 32 applies a pressure from upper to lower portions in the drawing, the upper die 10 and the lower die 20 of the resin molding die 1 shown in FIG. 1A are attached being upside done.

In the resin molding 1 in this embodiment, an iron-based hard alloy having a hardness greater than a predetermined value is used for the gate portions 13, 23, while an alloy other than the iron-based hard alloy having a hardness lower than the predetermined hardness is used at least for the cavity blocks 11 and 21 and the center block 12 except for the gate portions 12, 23.

The iron-based hard alloy means herein such an alloy conditioned to a Vickers hardness Hv=about 58–63 and a Young's modulus of about $2 \times 10^{12}$ dyn/cm$^2$, for example, by hardening.

The gate portions 13, 23 are made detachable from the cavity blocks 11, 21 and they are made, for example, of a super hard alloy, among the iron hard alloys, having a hardness of greater than the predetermined value.

Further, an alloy, other than the iron-based hard alloy, having a hardness lower than the predetermined hardness of the material constituting the gate portions 12, 23, for example, aluminum hard alloy or copper hard alloy is used.

The above-mentioned alloy has Vickers hardness Hv=about 40–55 and a Young's modulus of about $1 \times 10^4$ dyn/cm$^2$ to $1 \times 10^{12}$ dyn/cm$^2$.

By the use of such an alloy for the cavity blocks 11, 21 and the center block 12, when the upper die 10 and the lower die 20 are clamped by the molding machine as shown in FIG. 1B, the load required for obtaining the elastic deformation of such an amount as not to leak the resin between the dies can be lowered as compared with a case of using the iron-based hard alloy.

That is, by the use of an alloy having a lower hardness than the iron hard alloy as the cavity blocks 11, 21 and the center block 12, the load for obtaining required elastic deformation amount can be lowered, and the load of the press mechanism in a case of applying die clamping so as not to leak the resin (refer to FIG. 1B) can be reduced.

Specifically, when the aluminum-based hard alloy is used for the cavity blocks 11 and 21 and the center block 12 in transfer molding for resin-encapsulating an element mounted to a lead frame of a semiconductor device, the die clamping load so as not to cause leakage of the resin can be reduced to about 1/10 of the prior art.

Further, when a copper-based hard alloy is used for the cavity blocks 11, 21 as the center block 12, the clamping load so as not to leak the resin can be reduced to about 1/7–1/8. In either of the materials, the resin injecting pressure is identical as in the prior art.

That is, since the required die clamping pressure can be reduced, in the case of using the resin molding die 1 in this embodiment, the scale of the press mechanism 31 of the molding machine 30 shown in FIG. 1B can be reduced.

In a case of using a resin molding die made of an iron-based hard alloy in the transfer molding in usual production of semiconductor devices, since about 196 kN clamping load is required per one lead frame, it is necessary to adopt a large-scaled press mechanism 31 having a hydraulic cylinder.

By the way, in a case of using the resin molding die 1 in this embodiment, since the die clamping load per one lead frame can be reduced to about 20 kN, even a small press mechanism 31 using an air cylinder or the like may be used.

Further, in the resin molding die 1, holder basis 14, 24 and support pillars 16, 26 as well as the cavity blocks 11, 21 and the center block 12 may also be made of having a hardness less than the hardness of the iron-based hard alloy.

That is, the clamping load for the upper die 10 and the lower die 20 can be lowered by using the material as described before (for example, aluminum-based hard alloy or copper-based hard alloy) for the cavity blocks 11, 21 and the center block 12 and, correspondingly, loads exerting from the press mechanism 31 (refer to FIG. 1B) to other portions can also be lowered.

Therefore, even if the same material is used for the portions other than the cavity blocks 11, 21 and the center block 12, it does not result in insufficient strength.

Further, in this instance, when the aluminum-based hard alloy is used for the holder basis 14, 24 and the support pillars 16, 26 in addition to the cavity blocks 11, 21 and the center block 12, the entire weight of the resin molding die 1 can be reduced remarkably together with the effect capable of lowering the clamping load as explained before.

Specifically, if the aluminum-based hard alloy is used for the above-mentioned portions, the entire weight of the resin molding die 1 can be reduced to about 35% compared with the case of using the iron-based hard alloy.

Reduction for the entire weight of the resin molding die 1 can improve the efficiency of operation such as exchange for steps.

Next, description will be made to steps for molding a semiconductor device using the resin molding die 1 in this embodiment with reference to FIGS. 2A to 2D.

FIGS. 2A to 2D show an example of pressing a resin 50 upward in the figure.

Figure 2A:
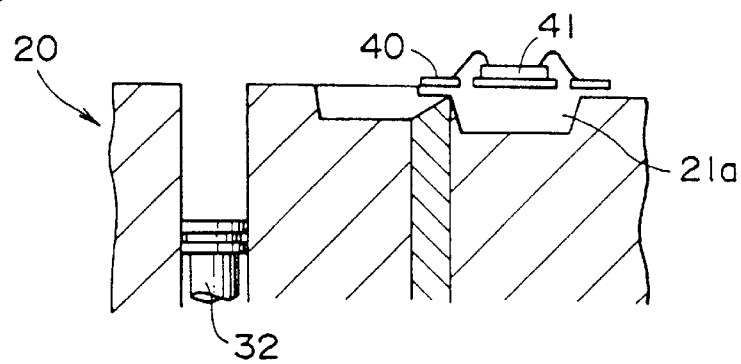
FIGS. 2A to 2D are schematic cross sectional views for explaining molding step in the order of steps shown in the figures.

At first, as shown in FIG. 2A, a lead frame 40 having a semiconductor device mounted thereon is disposed above the cavity 21a of the lower die 20.

The lead frame 40 is made, for example, of 42 alloy having a thickness of about 0.1 mm to 0.3 mm.

Figure 2B:
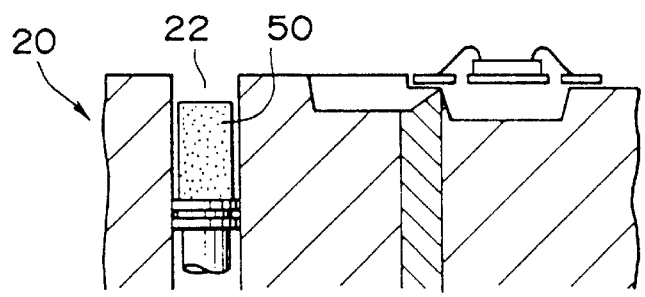

Then, as shown in FIG. 2B, a tablet-shaped resin 50 is set in the pot 22 of the lower die 20.

The tablet-shaped resin 50 is heated to 150° C.–200° C. undergoing heat from previously heated lower die 20.

Figure 2C:
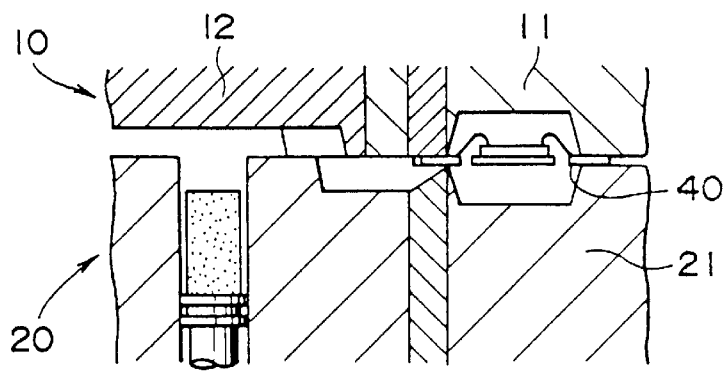

Then, as shown in FIG. 2C, the upper die 10 and the lower die 20 are joined to conduct die clamping. The lead frame 40 is put between the upper die 10 and the lower die 20 by the clamping, and the portion of the upper die 10 and the lower die 20 in contact with the lead frame 40 deforms elastically under a predetermined load. The elastic deformation can prevent the leakage of the resin.

In this embodiment, since at least the cavity blocks 11, 21 and the center block 12 of the upper die 10 and the lower die 20 are made, for example, of aluminum-based hard alloy or copper-based hard alloy as described previously, the die clamping load for obtaining a required amount of elastic deformation can be lowered sufficiently as compared with the case of using the iron-based hard alloy.

Both of the upper and lower dies 10 and 20 for resin encapsulation are made of a hard material having Hv hardness of about 58 or a material with less distortion, that is, iron-based hard alloy such as SKD/SKH, and surface treatment such as hard chromium plating is applied to the surface of the cavity blocks 11, 21. A material which is soft and elastic when a pressing force is exerted such as TEFLON® (e.g., polytetrafluoroethylene) or silicon rubber is coated to a thickness of ten and several micrometers or appended to a thickness of several millimeters on the surface of the cavity blocks 11, 22 to at lest a portion of pressing the lead frame. According to an experiment, when a soft material such as teflon is coated to a thickness of ten and several micrometers to a portion of pressing the lead frame, the pressing force (load) of the resin encapsulating device M that clamps the resin encapsulating upper die A and the resin encapsulating lower die B to each other can be reduced to 103 kN/lead frame (10.5 ton/lead frame) which is about one-half of the load in the prior art, under the condition of the encapsulating resin injection pressure at 7.8 MPa (80 kg/cm$^2$).

At least the cavity blocks 11, 21 of the resin encapsulating upper and lower dies 10, 20 are formed by using a material having a high hardness Hv of about 51 and showing a large distortion upon undergoing a pressing force, that is, a copper-based hard alloy (for example beryllium copper) or aluminum-based hard alloy and then applied with a surface treatment like that in the prior art. When such resin-encapsulating upper and lower dies A, B are used, the pressing force (load) of the resin encapsulating device that clamps the resin encapsulating upper die A and the resin encapsulating lower die B to each other can be reduced to 46.1 kN/lead frame (4.7 ton/lead frame), which is about less than ¼ of the prior art, under the condition of the encapsulating resin injection pressure at 7.8 MPa (80 kg/cm$^2$). Further, the method also has a merit capable of reducing the entire weight of the resin encapsulating upper and lower dies A and B by about 3 kg, respectively, and facilitating replacement with other resin encapsulating upper and lower dies A and B of other shapes as described above.

In a state where the upper die 10 and the lower die 20 are clamped, tie bars (not illustrated) of the lead frame 40 bite into the cavity blocks 11, 22 within a range of elastic deformation thereof, so that minute variation of a surface pressure at the gap can be absorbed by the elastic deformation to prevent leakage of the resin.

Figure 2D:
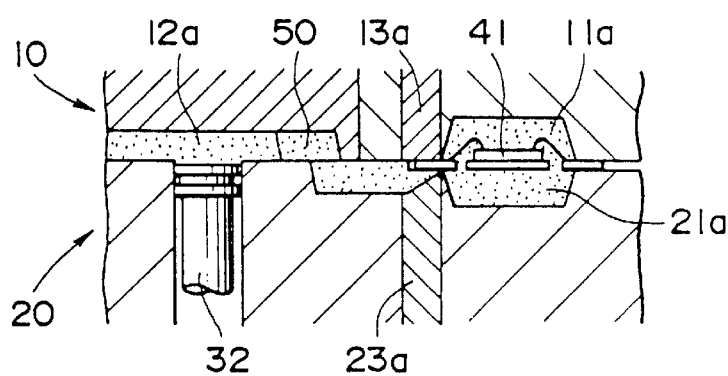

Then, as shown in FIG. 2D, the resin 50 melted by heating is pressurized by the plunger 32 and injected from the cull portion 12a by way of the gate portions 13a, 23a into the cavities 11a, 21a.

In this step, the frictional contact with the resin 50 is extremely increased at the gate portions 13a, 23a by the restriction of the flow channel and the wearing resistance can be improved by using a super hard alloy as a material therefor.

The resin 50 injected from the gate portions 13a, 23a is filled in the cavities 11a, 21a and encapsulates the periphery of the semiconductor device 41 to form a package of a predetermined shape. In this case, the contact portion between the upper die 10 and the lower die 20 with the tie bars (not illustrated) of the lead frame 40 causes required elastic deformation, so that no leakage of the resin 50 occurs. Satisfactory products of semiconductor devices can be manufactured with no residual resin burs after molding.

In this embodiment, although description has been made to an illustrated example of the resin molding die 1 used in transfer mold upon manufacturing the semiconductor device, the present invention is not restricted only thereto but is applicable also in a case of using other molding methods such as injection molding.

Further, although an example is shown for a case of using the aluminum-based hard alloy or copper-based hard alloy as the material at least for the cavity blocks 11, 21 and the center block 12 excepting for gate portions 12a, 23a of the upper die 12 and the lower die 20, a material other than that described above is also applicable so long as the alloy is other than the iron-based hard metal composed having a lower hardness than the hardness of the gate portions 12a, 23a.

As has been described above, the resin molding die according to the present invention can provide the following advantageous effects.

That is, in the resin molding die according to the present invention, since an alloy other than the iron-based hard metal alloy having a hardness lower than the hardness of the gate portion is used at least for the insert block excepting the gate portion of the upper die and the lower die, the load for obtaining the required elastic deformation in such an amount as causing no resin leakage upon die clamping can be reduced greatly as compared with the case of using the iron-based hard alloy.

Therefore, the size of the press mechanism in the molding machine can be decreased and the size of the molding machine can be reduced as a whole.

What is claimed is:

1. A resin molding die for use in encapsulating a semiconductor device having a peripheral lead frame with a molding resin, said die comprising:

a die body defining a molding cavity dimensioned to receive the semiconductor device and a first portion of the lead frame, a resin supply channel and a gate defining a resin flow passageway extending between the resin supply channel and the molding cavity, said die body including an upper die half and a complimentary lower die half, the upper die half including a center block insert having a cull portion and at least one adjacent cavity block insert, the cavity block insert including a surface having a mold recess and an edge portion adjacent the mold recess, a removable gate half disposed in the cavity block insert, the lower die half including a center block insert having a pot portion and at least one adjacent cavity block insert including a surface having a mold recess and an edge portion adjacent the mold recess, a removable gate half disposed in the cavity block insert, the surface of the upper die half cavity block insert and the surface of the lower die half cavity block insert each having a silicone rubber layer disposed thereon covering at least the edge portions thereof, the upper and lower die halves being reciprocally movable towards each other in abutting face to face relationship over the semiconductor device and lead frame such that the mold recesses cooperate to define the mold cavity, the gate halves cooperate to define the gate portion and the pot and cull portions cooperate to define the resin supply channel and second portions of the lead frame are received between the edge portions of the upper and lower cavity block inserts.

2. A resin molding die as defined in claim 1, wherein the gate halves of the upper and lower cavity block inserts comprise an iron based hard alloy having a Vickers hardness Hv of from about 58 to about 63 and a Young's modulus of about $2 \times 10^{12}$ dynes/cm$^2$.

3. A resin molding die as defined in claim 1, wherein the gate halves comprise a super hard, iron hard alloy.

4. A resin molding die as defined in claim 1, wherein the silicone rubber layers are disposed on the entire surfaces of the upper and lower cavity block inserts.

5. A resin molding die as defined in claim 1, wherein the surface of the upper die and the lower die cavity block inserts comprise a hard chromium plating.

6. A resin molding die as defined in claim 1, wherein the silicone rubber layers each have a thickness of 10 μm or more.

7. A resin molding die for use in encapsulating a semiconductor device having a peripheral lead frame with a molding resin, said die comprising:

a die body defining a molding cavity dimensioned to receive the semiconductor device and a first portion of the lead frame, a resin supply channel and a gate defining a resin flow passageway extending between the resin supply channel and the molding cavity, said die body including an upper die half and a complimentary lower die half, the upper die half including a center block insert having a cull portion and at least one adjacent cavity block insert, the cavity block insert including a surface having a mold recess and an edge portion adjacent the mold recess, a removable gate half disposed in the cavity block insert, the lower die half including a center block insert having a pot portion and at least one adjacent cavity block insert including a surface having a mold recess and an edge portion adjacent the mold recess, a removable gate half disposed in the cavity block insert, the upper and lower cavity block inserts comprising an aluminum-based hard alloy or a copper-based hard alloy and having a Vickers hardness Hv of from about 40 to about 55 and a Young's modulus of from about $1 \times 10^4$ dyn/cm$^2$ to about $1 \times 10^{12}$ dyn/cm$^2$, the gate halves of the upper and lower cavity block inserts comprising an iron-based hard alloy having a Vickers hardness Hv of from about 58 to about 63 and a Young's modulus of about $2 \times 10^{12}$ dynes/cm$^2$, the surface of the upper die half cavity block insert and the surface of the lower die half cavity block insert each having a silicone rubber layer disposed thereon covering at least the edge portions thereof, the upper and lower die halves being reciprocally movable towards each other in abutting face to face relationship over the semiconductor device and lead frame such that the mold recesses cooperate to define the mold cavity, the gate halves cooperate to define the gate portion and the pot and cull portions cooperate to define the resin supply channel and second portions of the lead frame are received between the edge portions of the upper and lower cavity block inserts.

8. A resin molding die as defined in claim 7, wherein the surface of the upper die and the lower die cavity block inserts comprise a hard chromium plating.

* * * * *